(12) United States Patent
Yeh (10) Patent No.: US 8,300,738 B2
(45) Date of Patent: Oct. 30, 2012

(54) POWER-SAVING METHOD FOR VITERBI DECODER AND BIT PROCESSING CIRCUIT OF WIRELESS RECEIVER

(75) Inventor: Shih-Yi Yeh, Hsinchu (TW)

(73) Assignee: Ralink Technology Corp., Hsinchu (TW)

( * ) Notice: Subject to any disclaimer, the term of this patent is extended or adjusted under 35 U.S.C. 154(b) by 999 days.

(21) Appl. No.: 12/328,070

(22) Filed: Dec. 4, 2008

(65) Prior Publication Data

US 2009/0213967 A1    Aug. 27, 2009

(30) Foreign Application Priority Data

Feb. 22, 2008 (TW) ................................. 97106201 A (51) Int. Cl.
*H03D 1/00* (2006.01)
*H04L 27/06* (2006.01)

(52) U.S. Cl. ........................................................ 375/341

(58) Field of Classification Search .................. 375/147, 375/225, 262, 265, 316, 340, 341, 346, 377
See application file for complete search history.

(56) References Cited

U.S. PATENT DOCUMENTS

| | | | | |
|---|---|---|---|---|
| 4,879,720 A | * | 11/1989 | Shumate et al. | 714/789 |
| 5,832,001 A | * | 11/1998 | Choi | 714/790 |
| 5,907,586 A | * | 5/1999 | Katsuragawa et al. | 375/341 |
| 6,094,465 A | * | 7/2000 | Stein et al. | 375/346 |
| 6,424,631 B1 | * | 7/2002 | Czaja et al. | 370/252 |
| 6,760,385 B1 | * | 7/2004 | Goodson | 375/265 |
| 2006/0045214 A1 | * | 3/2006 | Shiina | 375/341 |
| 2007/0106720 A1 | * | 5/2007 | Pisek et al. | 708/523 |

* cited by examiner

*Primary Examiner* — David C. Payne
*Assistant Examiner* — Syed Haider
(74) *Attorney, Agent, or Firm* — Convergent Law Group LLP (57) ABSTRACT

A power-saving method for Viterbi decoder and bit processing circuit of wireless receiver is provided. In response to various computational load of bit processing circuit and/or Viterbi decoder of a wireless receiver, the method is used for adjusting duty cycle of the bit processing circuit and/or the Viterbi decoder so as to save power in addition, in response to various data rates of the wireless receiver, the Viterbi decoder and the bit processing circuit are provided with power based on various duty cycles of related time pulse signals, thereby preventing the Viterbi decoder and/or the bit processing circuit from consuming power while being idle (during time segments of idle operation), so as to reduce power consumption.

12 Claims, 7 Drawing Sheets

| MCS | $N_{BPSC}$ | R | $N_{BPSC} * R$ | ratio (r) |
|---|---|---|---|---|
| 0 | 1 | 1/2 | 1/2 | 1/10 |
| 1 | 2 | 1/2 | 1 | 2/10 |
| 2 | 2 | 3/4 | 3/2 | 3/10 |
| 3 | 4 | 1/2 | 2 | 4/10 |
| 4 | 4 | 3/4 | 3 | 6/10 |
| 5 | 6 | 2/3 | 4 | 8/10 |
| 6 | 6 | 3/4 | 9/2 | 9/10 |
| 7 | 6 | 5/6 | 5 | 1 |

POWER-SAVING METHOD FOR VITERBI DECODER AND BIT PROCESSING CIRCUIT OF WIRELESS RECEIVER

CROSS-REFERENCE TO RELATED APPLICATIONS

This application claims benefit of foreign priority under 35 USC §119, to Taiwan Patent Application No. 097106201, filed on Feb. 22, 2008, which is incorporated herein by reference.

BACKGROUND OF THE INVENTION

1. Field of the Invention

This invention generally relates to a power-saving method for Viterbi decoder and a bit processing circuit of a wireless receiver, and more specifically, to a power-saving method, wherein power is provided to the Viterbi decoder and the bit processing circuit based on various duty cycles of time pulse signals corresponding to various data rates applied by the wireless receiver.

2. Description of Related Art

In modern communication system, power consumption reduction has become an important issue that wireless receiver designers have to take into consideration. Especially to a mobile communication system, lower power consumption means that it takes longer time to consume up power of allocated battery, thereby providing user with more convenience.

Figure 1:
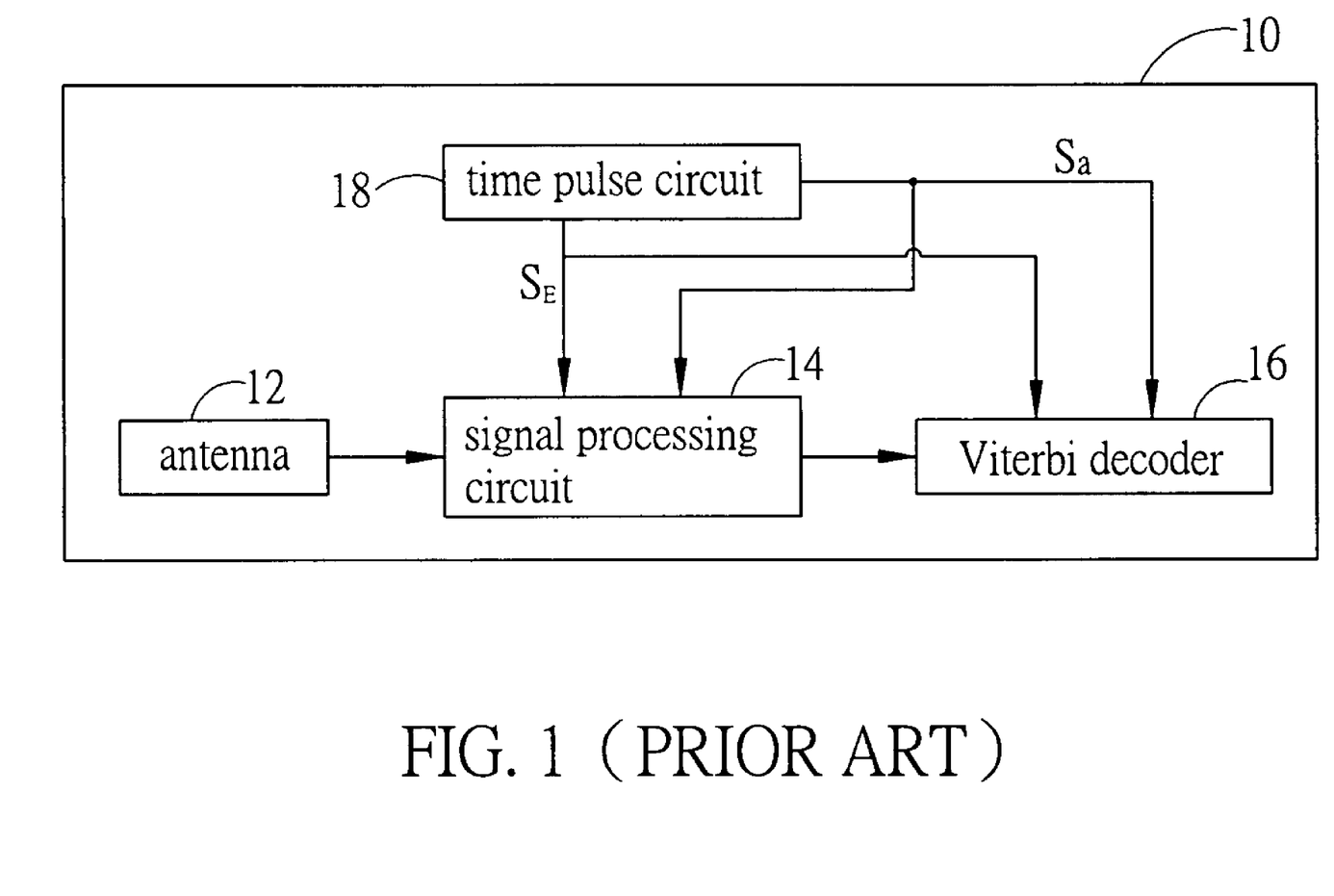
FIG. 1 is a basic framework block diagram of a conventional wireless receiver.

Please refer to FIG. 1, which is a basic framework block diagram of a prior wireless receiver 10. The wireless receiver 10 is an orthogonal frequency division multiplexing (OFDM) receiver for wireless communication by means of orthogonal frequency division multiplexing technique. Briefly speaking, the orthogonal frequency division multiplexing technique divides a data string with high data rate into a plurality of data strings with low data rate, and then transmits the plurality of data strings with low data rate simultaneously via a plurality of subcarriers, thereby achieving high data rate transmission and resistance of frequency selective fading. The wireless receiver 10 comprises an antenna 12, a signal processing circuit 14, a Viterbi decoder 16, and a time pulse circuit 18. The antenna receives OFDM signal, and then the signal processing circuit 14 performs process of OFDM signal received by the antenna 12, e.g. filtering, time domain/frequent domain conversion, etc. In general, the Viterbi decoder is allocated to the modern communication system for performing Viterbi decoding process on signals transmitted from signal processing circuit 14, and the time pulse circuit 18 is used for producing enabling signal $S_E$ and time pulse signal Sa to control performances of the signal processing circuit 14 and the Viterbi decoder 16. The enabling signal $S_E$ enables the signal processing circuit 14 and the Viterbi decoder 16. In other words, only when the enabling signal $S_E$ is at high electric potential, the signal processing circuit 14 and the Viterbi decoder 16 are enabled to operate. In addition, time pulse signals Sa determine various operations of the signal processing circuit 14 and the Viterbi decoder 16.

In the prior art, power-saving strategy of wireless receiver 10 controls electric potential of the enabling signal $S_E$. Please refer to FIG. 2, which is a time sequence diagram illustrating enabling signal $S_E$ and time pulse signal Sa produced by the time pulse circuit 18 of FIG. 1. During the time the wireless receiver 10 is receiving packets, e.g. time segments $T_1$ and $T_2$, the enabling signal $S_E$ is pulled up to a high electric potential, thereby enabling the signal processing circuit 14 and the Viterbi decoder 16 to operate and process the received packets. While at the time the wireless receiver 10 is in an idle state without receiving any packet, e.g. time segment $T_2$, the enabling signal $S_E$ is pulled down to a low electric potential, thereby stopping the signal processing circuit 14 and the Viterbi decoder 16 from operating temporarily, so as to save power.

Figure 2:
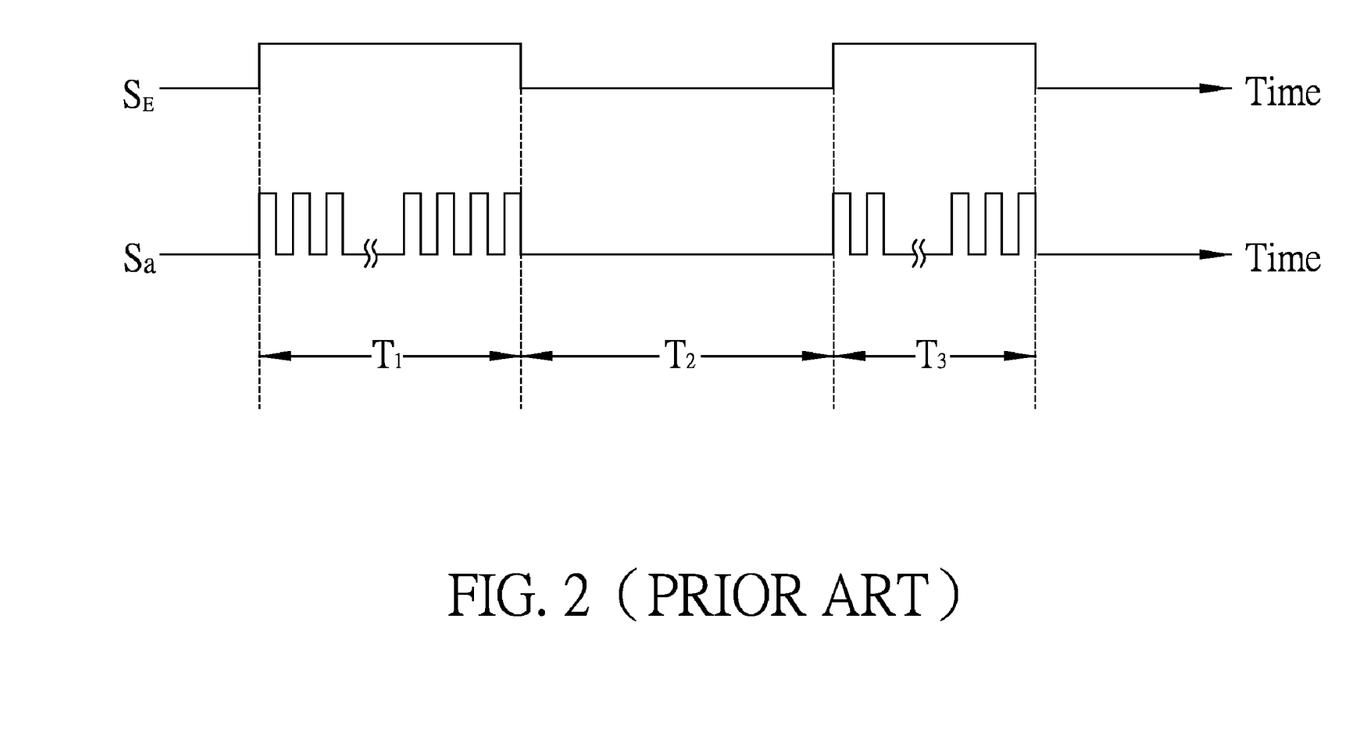
FIG. 2 is a time sequence diagram illustrating enabling signal $S_E$ and time pulse signal Sa produced by the time pulse circuit 18 of FIG. 1.

However, the aforementioned power-saving method of a wireless receiver is not ideal, and there are still some bases are overlooked, thereby causing unnecessary power consumption. For instance, data rate of wireless receiver varies with factors such as distance from sending device, etc., and when the data rate of wireless receiver changes, total data processed by the Viterbi decoder 16 during each processing cycle vary from one anther processing cycle accordingly. When the data rate of wireless receiver is high, the Viterbi decoder 16 might need time as long as the time segments $T_1$ and $T_3$ for performing a full decoding process. However, when the data rate of wireless receiver 10 is low, practical time needed for the Viterbi decoder 16 to perform the full decoding process is only partial the time segments $T_1$ and $T_3$ and is shorter than the time segments $T_1$ and $T_3$. Since the Viterbi decoder 16 is controlled by the time pulse signal Sa, when the Viterbi decoder 16 has completed the full decoding process, the Viterbi decoder 16 is in a state of idle operation during remaining time of the time segments T1 and T3, thereby causing unnecessary power consumption.

SUMMARY OF THE INVENTION

In view of the disadvantages of the prior art mentioned above, the present invention provides a power-saving method for Viterbi decoder and bit processing circuit of wireless receiver for avoiding unnecessary power consumption while the Viterbi decoder and the bit processing circuit are in a state of idle operation, thereby achieving better power-saving outcome.

The power-saving method for the Viterbi decoder of wireless receiver comprises determining at least one numerical value related to a data rate applied by the wireless receiver while receiving packet; and deciding a duty cycle of the Viterbi decoder based on the at least one numerical value, and power is then provided to the Viterbi decoder based on the duty cycle of the Viterbi decoder.

In accordance with the present invention, the wireless receiver has a time pulse circuit for outputting a time pulse signal to control the bit processing circuit so as to perform bit process of the wireless receiver. And, the power-saving method for bit processing circuit of a wireless receiver comprises determining a data rate applied by the wireless receiver while receiving packet; deciding a duty cycle of time pulse signal based on the data rate; and then providing the bit processing circuit with power based on the duty cycle of time pulse signal.

Compared with conventional wireless receiver, the power-saving method for Viterbi decoder and bit processing circuit of wireless receiver in the present invention controls power supply of the Viterbi decoder and the bit processing circuit by adopting various duty cycles of time pulse signal corresponding to various data rates of the wireless receiver. Therefore, when total data to be processed by a wireless receiver in a processing cycle change with factors such as distance from sending device, etc., the supply of power for the bit processing circuit and the Viterbi decoder of the wireless receiver is stopped while both are in a state of idle operation, thereby achieving better power-saving outcome.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention. These and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

In order to solve the drawbacks shown in the prior art, causes of power consumption of wireless receiver based on operational mode of each component of the wireless receiver are analyzed, and a scheme of reducing power-consumption without affecting normal operation of the wireless receiver is provided.

Figure 3:
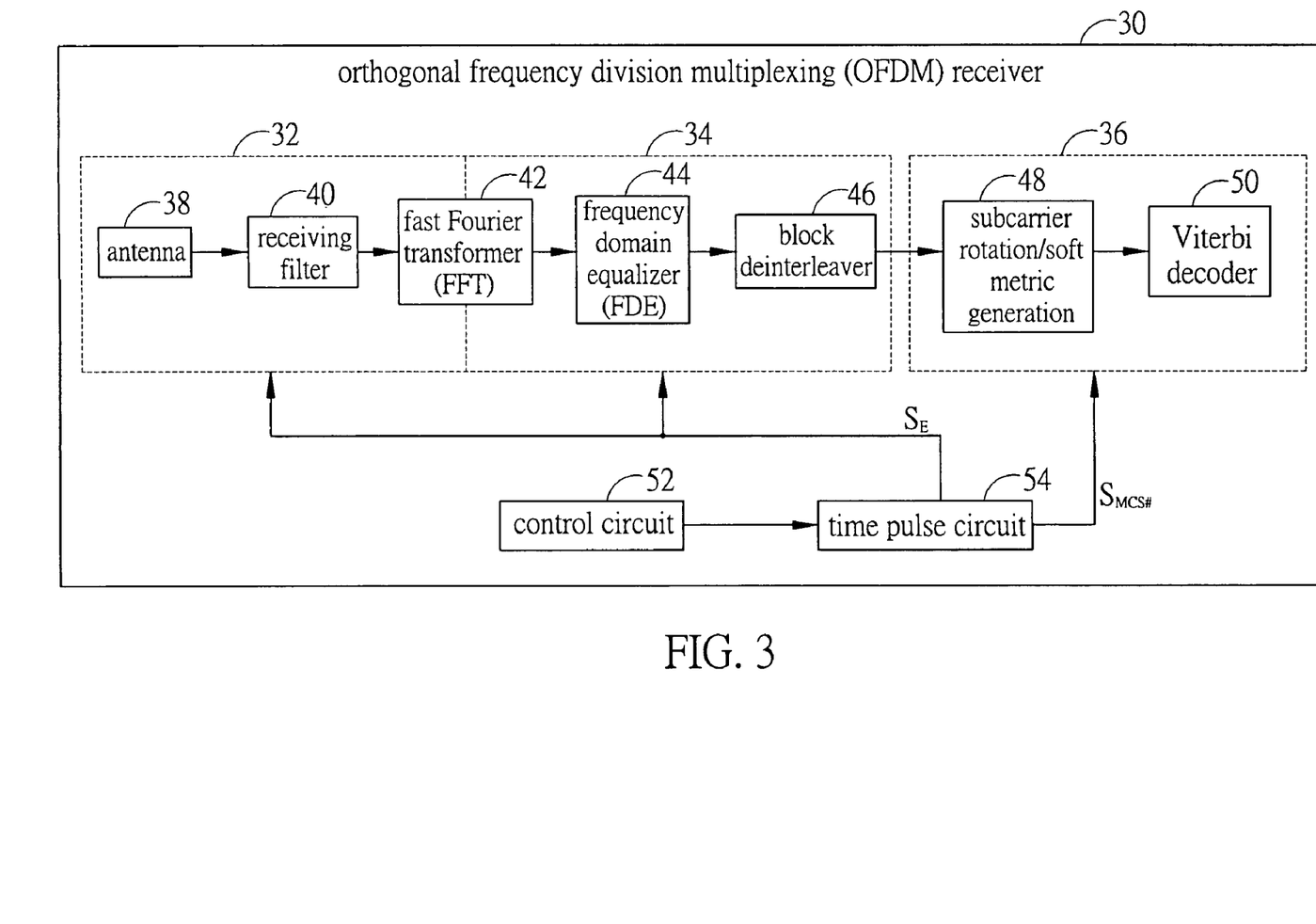
FIG. 3 is a basic framework block diagram illustrating the power-saving method for Viterbi decoder of wireless receiver of the present invention applied to a wireless receiver.

Please refer to FIG. 3, which is a basic framework block diagram illustrating a preferable embodiment of power-saving method for Viterbi decoder of wireless receiver of the present invention. As shown in FIG. 3, the power-saving method is applied to a wireless receiver 30. In the present embodiment, the wireless receiver 30 is an orthogonal frequency division multiplexing (OFDM) receiver. However, it should be noted that the present invention is not limited to orthogonal frequency division multiplexing receivers. The power-saving method of the present invention can be also used in other communication receivers, such as a code division multiple access (CDMA) receiver, etc. According to the function and the operational mode of each component, the orthogonal frequency division multiplexing receiver 30 is roughly divided into three parts: a time domain symbol processing circuit 32, a frequency domain tone processing circuit 34, and a bit processing circuit 36.

The time domain symbol processing circuit 32 comprises an antenna 38 for receiving wireless signals, and a receive filter (RXF) 40 or a receiver front-end for filtering the wireless signals received by the antenna 38. A fast Fourier transformer (FFT) 42 is allocated between the time domain symbol processing circuit 32 and the frequency domain tone processing circuit 34. The fast Fourier transformer (FFT) performs Fourier transform process on the electronic signal transmitted from the receive filter (RXF) 40 or a receiver front-end, thereby converting the electronic signal to a frequency domain signal.

The frequency domain tone processing circuit 34 comprises a frequency domain equalizer (FDE) 44 and a block deinterleaver 46, wherein the frequency domain equalizer (FDE) 44 compensates symbol distortion, and the block deinterleaver 46 performs block deinterleaving process on the signal.

The bit processing circuit 36 comprises a subcarrier rotation/soft metric generation (SCR/SMG) 48 and a Viterbi decoder 50, wherein the SCR/SMG 48 performs bit processing, e.g. subcarrier rotation, etc., on signal transmitted from the block deinterleaver 46, and the Viterbi decoder 50 performs Viterbi decoding process on data transmitted from the SCR/SMG 48.

In addition, the orthogonal frequency division multiplexing (OFDM) receiver 30 further comprises a control circuit 52 and a time pulse circuit 54, wherein the control circuit 52 controls time pulse circuit 54 to produce proper enabling signal $S_E$ and time pulse signal $S_{MCS\#}$. The enabling signal $S_E$ is transmitted to the time domain symbol processing circuit 32 and the frequency domain tone processing circuit 34, and then enables the time domain symbol processing circuit 32 and the frequency domain tone processing circuit 34. The time pulse signal $S_{MCS\#}$ is transmitted to the bit processing circuit 36 for controlling operation of the bit processing circuit 36.

According to the present embodiment, time pulse signal $S_{MCS\#}$ can be $S_{MCS0}$, $S_{MCS1}$ ... $S_{MCS7}$ corresponding to the various data rates applied by the orthogonal frequency division multiplexing (OFDM) receiver 30, and therefore various time pulse signals produced by the time pulse circuit 54 can control the bit processing circuit 36 at various applied data rates respectively. The details of this part will be provided later. In addition, when a time pulse signal $S_{MCS\#}$ is at high electric potential, the SCR/SMG 48 and the Viterbi decoder 50 of the bit processing circuit 36 are then enabled. Accordingly, duty cycles of the SCR/SMG 48 and the Viterbi decoder 50 are the same as the duty cycle of the time pulse signal $S_{MCS\#}$. Besides, similar to the conventional wireless receiver, when the orthogonal frequency division multiplexing (OFDM) receiver 30 receives a packet, the enabling signal $S_E$ is pulled to a high electric potential, thereby enabling the time domain symbol processing circuit 32 and the frequency domain tone processing circuit 34 to operate and thus process the received packet. While the orthogonal frequency division multiplexing (OFDM) receiver 30 is in an idle state and not receiving any packet, the enabling signal SE is pulled to a low electric potential, thereby temporarily stopping the time domain symbol processing circuit 32 and the frequency domain tone processing circuit 34 from operation.

Consequently, for a given frequency bandwidth and number of spatial stream, total operations of the time domain symbol processing circuit 32 and the frequency domain tone processing circuit 34 will not change according to data rate applied by the orthogonal frequency division multiplexing (OFDM) receiver 30. However, total operations of the bit processing circuit 36 vary according to data rate applied by the orthogonal frequency division multiplexing (OFDM) receiver 30. Therefore, in order to save power, the control circuit 52 controls time pulse circuit 54 to produce time pulse signal $S_{MCS\#}$ based on data rate then applied by the orthogonal frequency division multiplexing (OFDM) receiver 30, thereby enabling duty cycle of the time pulse signal $S_{MCS\#}$ to vary based on data rate then applied by the orthogonal frequency division multiplexing (OFDM) receiver 30. Generally speaking, the higher data rate applied by the orthogonal frequency division multiplexing (OFDM) receiver 30, the longer duty cycle of the time pulse signal $S_{MCS\#}$ is. And, the lower data rate applied by the orthogonal frequency division multiplexing (OFDM) receiver 30, the shorter duty cycle of the time pulse signal $S_{MCS\#}$ is. Further, the shorter duty cycle of the time pulse signal $S_{MCS\#}$ is, the less power is consumed by the bit processing circuit 36. However, it should be noted that although the duty cycle of the time pulse signal $S_{MCS\#}$ is variable, the duty cycle of the time pulse signal $S_{MCS\#}$ is long enough for the SCR/SMG 48 and the Viterbi encoder 50 to complete necessary operations, thereby saving power without affecting normal operations of the SCR/SMG 48 and the Viterbi encoder 50.

In the aforesaid embodiment, the data rate then applied by the orthogonal frequency division multiplexing (OFDM) receiver 30 is used to control the duty cycle of the time pulse signal $S_{MCS\#}$, and is further used to control operations of the SCR/SMG 48 and the Viterbi decoder 50 at the same time. However, the present invention can control only the SCR/SMG 48 or the Viterbi decoder 50 for saving power.

Figure 4:
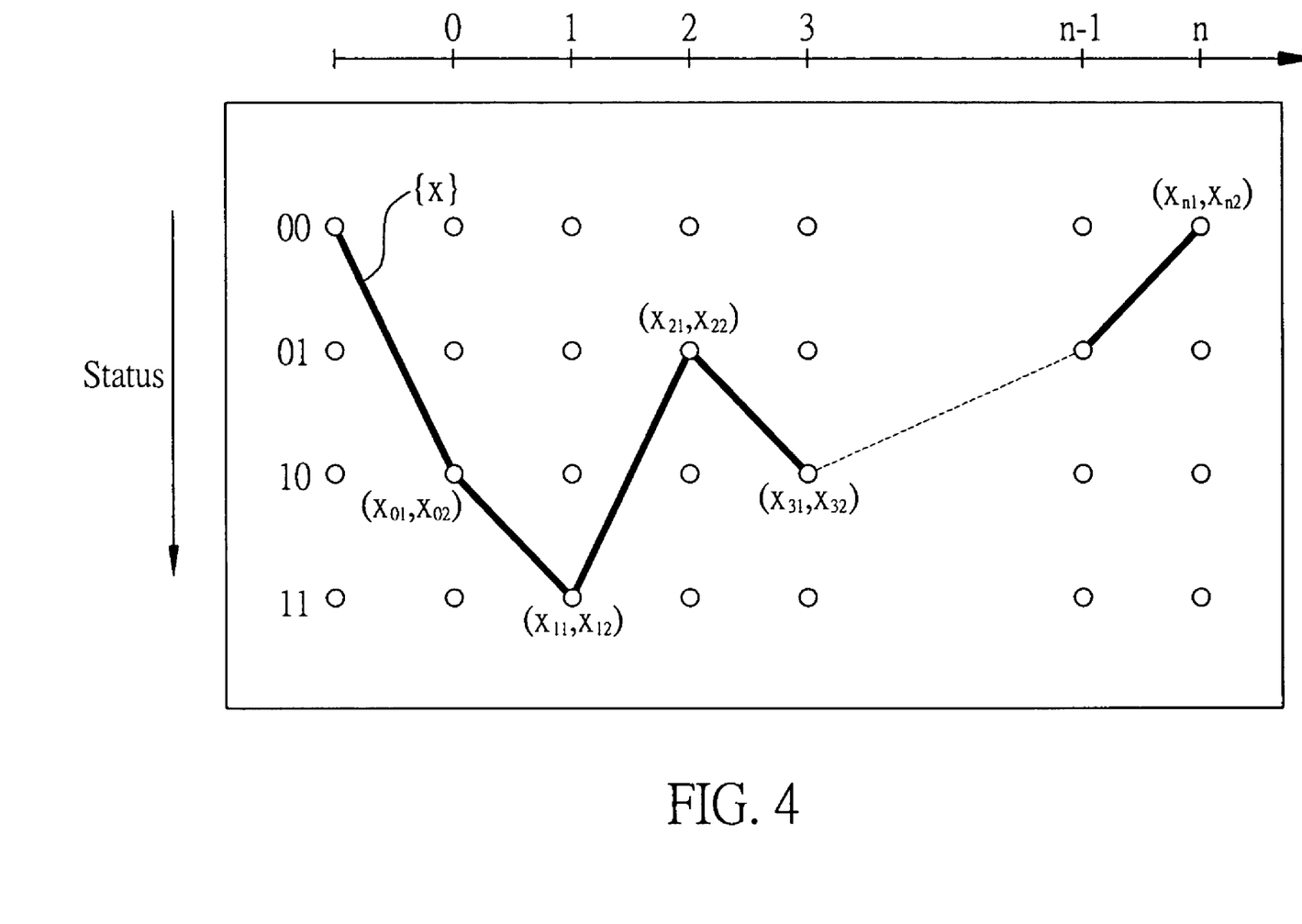
FIG. 4 is a diagram illustrating status trellis applied by the Viterbi decoder 50 of FIG. 3 in a decoding process.
Figure 5:
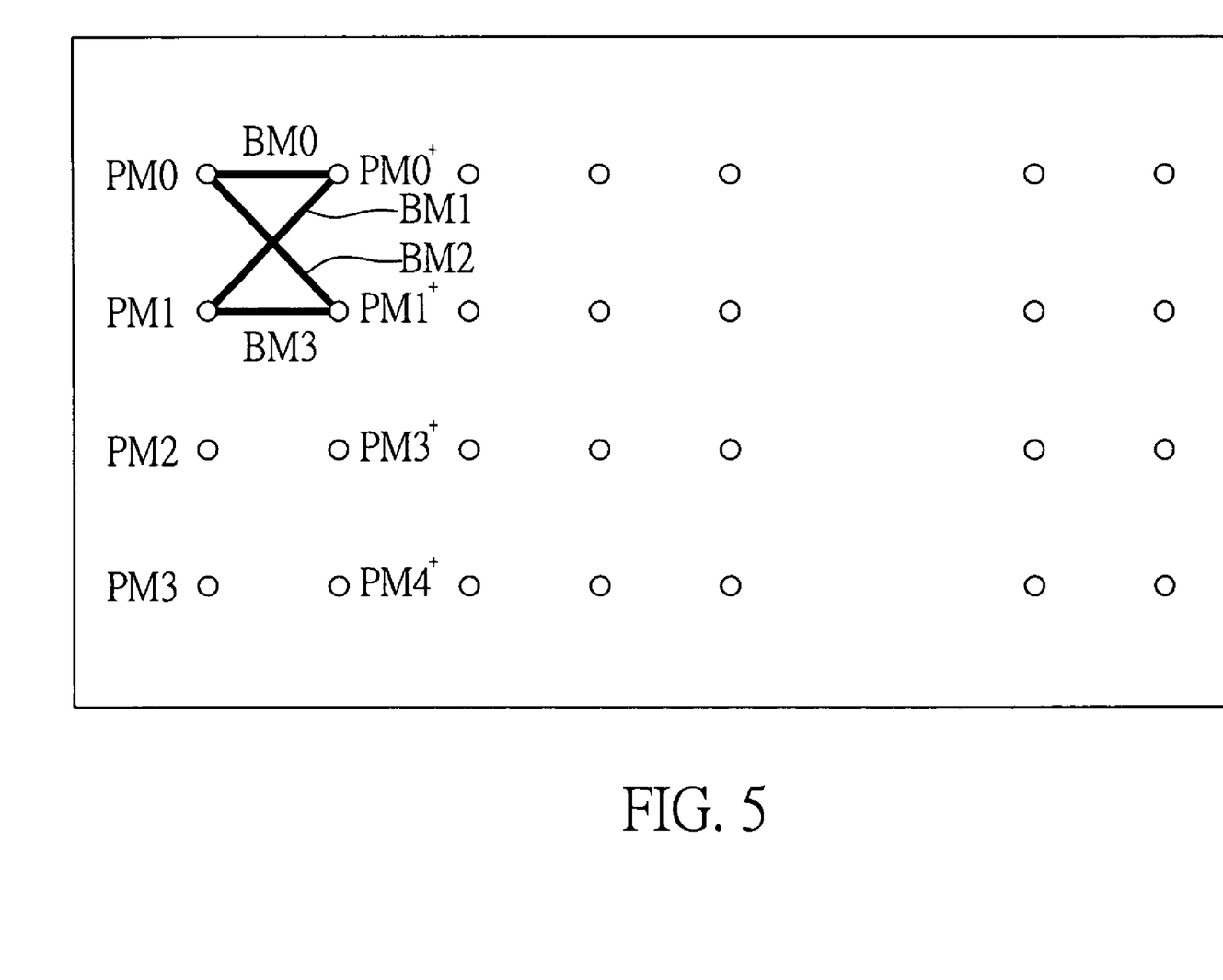
FIG. 5 is a diagram illustrating how the Viterbi decoder 50 of FIG. 3 performs butterfly calculation.

The Viterbi decoder 50 is controlled for reducing power consumption as follows. Please refer to FIG. 4, which is a diagram illustrating status trellis applied by the Viterbi decoder 50 while performing a decoding process; wherein y-axis shows status of decoder, and x-axis shows trellis level. The status of the decoder can be one among (00, 01, 10, 11), while trellis level can be any positive integer between 0 and n as shown in FIG. 4. Viterbi encoding scheme is an encoding scheme that produces a maximum likelihood for calculating an Euclidean distance, thereby acquiring a hypothetical array {z} that is mostly similar to a received array {x}. Therefore, it is the first step to calculate a shortest path metrics (PM) between all possible hypothetical arrays {z} and the received arrays {x}, wherein the shortest path metric can be presented by the following equation:

$$\min_{\{z\}} PM\{z\} = \min_{\{z\}} \sum_k |z_k - x_k|^2$$

wherein $Z_k$ and $X_k$ are symbols of the hypothetical array {z} and the received array {x} at trellis level k respectively. The next step is to calculate a shortest branch metrics (BM) between all possible hypothetical arrays {x} and the received arrays {x}, wherein the shortest branch metric can be presented by the following equation:

$$\min_{\{z\}} \sum_k BM_k = \min_{\{z\}} \sum_k -(x_{k1} z_{k1} + x_{k2} z_{k2})$$

wherein $(Z_{k1}, Z_{k2})$ and $(X_{k1}, X_{k2})$ are coordinates of the hypothetical array {z} and the received array {x} at trellis level k respectively. When the Viterbi decoder 50 performs the calculation of the shortest path metric (PM) and the shortest branch metric (BM), a butterfly calculation as shown in FIG. 5 is generally adopted by the Viterbi decoder 50 for performing so-called add-compare-select (ACS) operations. As shown in FIG. 5, path metric PM0⁺ at a specific level can be calculated based on path metric PM at its preceding level and related branch metric BM. For instance, PM0⁺ equals to either sum of PM0 and BM0 or sum of PM1 and BM1, whichever is smaller. PM1⁺ equals to either sum of PM0 and BM2 or sum of PM1 and BM3, whichever is smaller. Both statements can be respectively expressed by the following equations:

$$PM0^+ = \min(PM0+BM0, PM1+BM1)$$

$$PM1^+ = \min(PM0+BM2, PM1+BM3)$$

Operational method of Viterbi decoding is well understood by those skilled in the art, and there are countless variations. Therefore, the abovementioned descriptions illustrate only general rules of decoding process performed by the Viterbi decoder, and those skilled in the art should understand that the present invention is not affected by variations of Viterbi decoding methods.

Consequently, the sum of operations and the sum of required butterfly calculations performed by the Viterbi decoder 50 are in direct proportion, wherein the required butterfly calculations include calculations for producing the Euclidean distances and calculations of processing traceback. In addition, for any communication system that matches IEEE 802.11n or other specifications, if the communication system is capable of applying various coding rates R while applying same convolutional code with various puncturing scheme, the sum of operations of the Viterbi decoder 50 and the status trellis level applied by the Viterbi decoder 50 are in direct proportion, and also the sum of operations and product of every number of bit per subcarrier ($N_{BPSC}$), coding rate (R), number of data subcarrier ($N_{SD}$), and number of spatial stream ($N_{SS}$), i.e. $N_{BPSC} \times R \times N_{SD} \times N_{SS}$, are in direct proportion. Therefore, in another embodiment of the present invention, the control circuit 52 can control duty cycle of the time pulse signal $S_{MCS\#}$ based on product of the every number of bit per subcarrier ($N_{BPSC}$), the coding rate (R), the number of data subcarrier ($N_{SD}$), and the number of spatial stream ($N_{SS}$), i.e. $N_{BPSC} \times R \times N_{SD} \times N_{SS}$, so as to further reduce power consumed by the Viterbi decoder 50.

Sum of operations of Viterbi decoder 50 and product of every number of bit per subcarrier ($N_{BPSC}$), coding rate (R), number of data subcarrier ($N_{SD}$), and number of spatial stream ($N_{SS}$), i.e. $N_{BPSC} \times R \times N_{SD} \times N_{SS}$, are in direct proportion, and also an inference can be deduced from that "duty cycle of time pulse signal $S_{MCS\#}$ can be determined based on at least one factor among the group of every number of bit per subcarrier ($N_{BPSC}$), coding rate (R), number of data subcarrier ($N_{SD}$), and number of spatial stream ($N_{SS}$)". Therefore, the duty cycle of the time pulse signal $S_{MCS\#}$ is determined based on at least one factor among the group of every number of bit per subcarrier ($N_{BPSC}$), coding rate (R), number of data subcarrier ($N_{SD}$), and Number of spatial stream ($N_{SS}$), and the product thereof.

Figure 6:
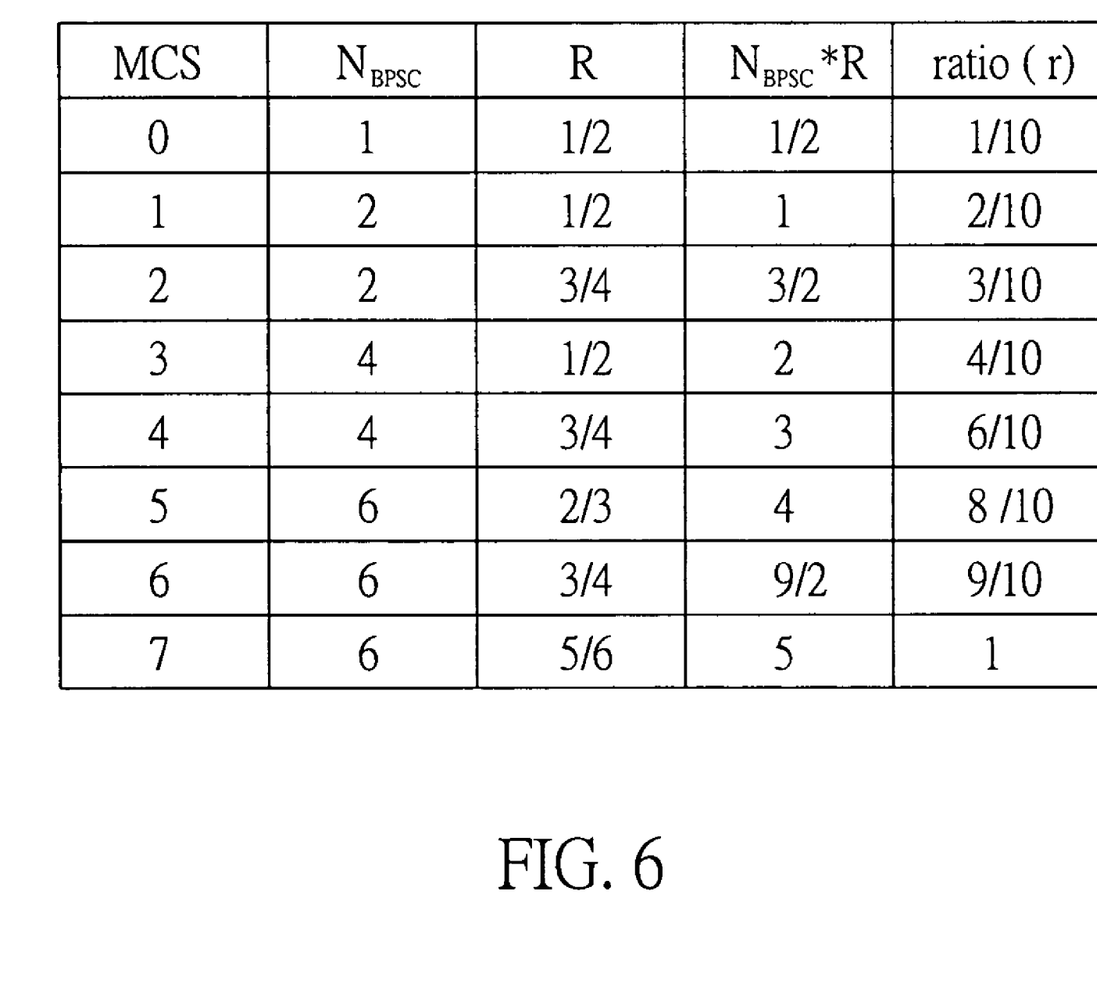
FIG. 6 is a lookup table showing every number of bit per subcarrier $N_{BPSC}$ and coding rate at various data rates.

Every number of bit per subcarrier ($N_{BPSC}$) and coding rate (R) are used to determine the duty cycle of the time pulse signal $S_{MCS\#}$ as follows. Please refer to FIG. 6, which is a lookup table showing every number of bit per subcarrier $N_{BPSC}$ and coding rate R at various data rates. As shown in FIG. 6, since various modulation and coding schemes (MCS) are applied, the orthogonal frequency division multiplexing (OFDM) receiver 30 adopts various coding rates. Also each modulation and coding scheme (MCS) has its own corresponding number of bit per subcarrier ($N_{BPSC}$) and coding rate (R). In the present embodiment, the duty cycle of the time pulse signal $S_{MCS\#}$ is determined by the product of every number of bit per subcarrier ($N_{BPSC}$) and coding rate (R). At first, a product of every number of bit per subcarrier ($N_{BPSC}$) and coding rate (R) is calculated correspondingly to each time pulse signal $S_{MCS\#}$. And then, a ratio (r) of each product to the greatest product is calculated. At last, according to each the ratio (r), the duty cycle of time pulse signal $S_{MCS\#}$ for each modulation and coding scheme (MSC) is calculated. For instance, since MCS7 has the greatest data rate, among various time pulse signals $S_{MCS0}$ through $S_{MCS7}$ produced by the time pulse circuit 54, the time pulse signal $S_{MCS7}$ corresponding to MCS7 has longest duty cycle. In other words, since MCS0 has shortest data rate, among various time pulse signals $S_{MCS0}$ through $S_{MCS7}$ produced by the time pulse circuit 54, time pulse signal $S_{MCS0}$ corresponding to MCS0 has shortest duty cycle. If duty cycle of the time pulse signal $S_{MCS7}$ is T the duty cycle of each of other time pulse signals $S_{MCS0}$ through $S_{MCS6}$ equals to the product of corresponding ratio (r) and T. For instance, the duty cycle of time pulse signal $S_{MCS0}$ is T/10, and duty cycle of time pulse signal $S_{MCS3}$ is 4T/10.

Figure 7:
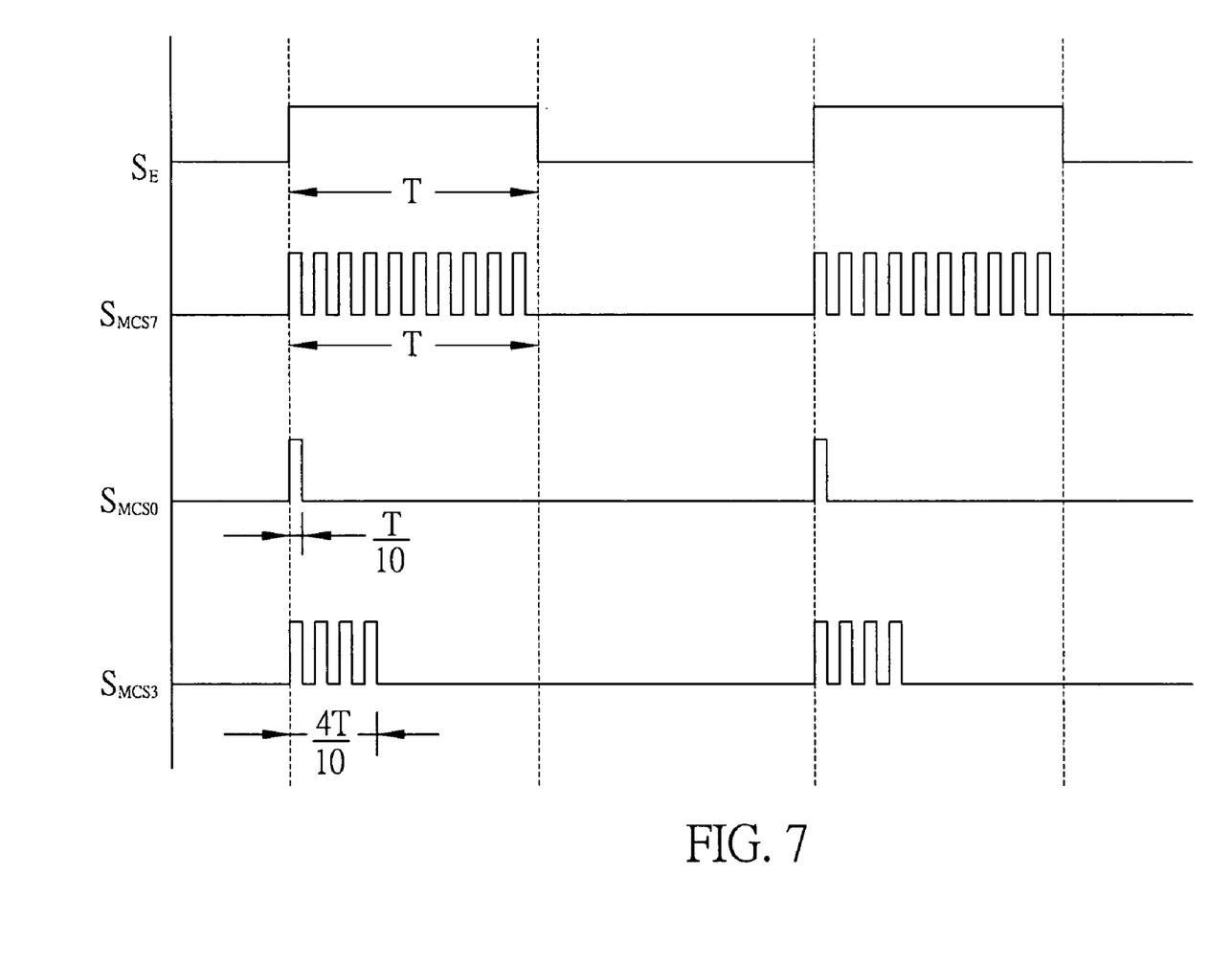
FIG. 7 is a time sequence diagram showing enabling signal $S_E$ and time pulse signals $S_{MCS0}$, $S_{MCS3}$, $S_{MCS7}$ produced by the time pulse circuit 54 of FIG. 3.

Please refer to FIG. 7, which is a time sequence diagram showing an enabling signal $S_E$ and time pulse signals $S_{MCS0}$, $S_{MCS3}$, $S_{MCS7}$ produced by the time pulse circuit 54 of FIG. 3 according to ratios (r) calculated and shown in FIG. 6. In the present embodiment, as shown in FIG. 7, the duty cycle of the enabling signal $S_E$ and duty cycle of the time pulse signal $S_{MCS7}$ have the same length. However, as long as the duty cycle of the time pulse signal $S_{MCS7}$ is long enough for the Viterbi decoder 50 to complete its decoding task, the duty cycle of the time pulse signal $S_{MCS7}$ is allowed to be shorter than the duty cycle of the enabling signal $S_E$, thereby reducing power consumption.

In addition, according to the foresaid description that "data rate is determined by modulation and coding scheme (MCS) that is then applied by the orthogonal frequency division multiplexing (OFDM) receiver 30 while receiving a packet", those skilled in the art should easily understand that the modulation and the coding scheme that is then applied by the orthogonal frequency division multiplexing (OFDM) receiver 30 can be used to determine the duty cycle of time pulse signal $S_{MCS\#}$.

In addition, as shown in FIG. 6, it is obvious that the larger the number of bit per subcarrier (NBPSC) is or the larger the coding rate (R) is, the larger the ratio (r) is. Consequently, time pulse signal $S_{MCS\#}$ corresponding to the number of bit per subcarrier ($N_{BPSC}$) or the coding rate (R) has longer duty cycle. Therefore, those skilled in the art can easily understand that either the number of bit per subcarrier ($N_{BPSC}$) or the coding rate (R) alone is capable of determining the duty cycle of the time pulse signal. For instance, a largest ratio (r) among same modulation and coding scheme is chosen for calculating duty cycle of the modulation and coding scheme, e.g., when $N_{BPSC}$ is 6, the duty cycle of modulation and coding scheme is T; when $N_{BPSC}$ is 4, the duty cycle of modulation and coding scheme is 6T/10; when $N_{BPSC}$ is 2, the duty cycle of modulation and coding scheme is 3T/10; and when $N_{BPSC}$ is 1, the duty cycle of modulation and coding scheme is T/10.

In addition to the foresaid approaches for determining duty cycle, those skilled in the art can also comprehend that the duty cycle of the time pulse signal $S_{MCS\#}$ can be determined by the product of any two, three, or four factors among the group of the number of bit per subcarrier ($N_{BPSC}$), the coding rate (R), the number of data subcarrier ($N_{SD}$), and number of spatial stream ($N_{SS}$).

In the conventional wireless receiver, idle operations frequently happen to the Viterbi decoder, thereby causing unnecessary power consumption. Compared with the prior art, the power-saving method for Viterbi decoder and bit processing circuit of wireless receiver of the present invention adopts various duty cycles of time pulse signals corresponding to various data rates of the wireless receiver, thereby reducing time of idle operation of bit processing circuit and/or Viterbi decoder of the wireless receiver, and further achieving better power-saving outcome.

Furthermore, since the bit processing circuit 36 performs bit processing on data packet received by the wireless receiver, according to the above descriptions, the power-saving method for the Viterbi decoder of a wireless receiver of the present invention is also applicable to the bit processing circuit 36.

The foregoing descriptions of the detailed embodiments are only illustrated to disclose the features and functions of the present invention and not restrictive of the scope of the present invention. It should be understood to those skilled in the art that all modifications and variations according to the spirit and principle in the disclosure of the present invention should fall within the scope of the appended claims.

What is claimed is:

1. A power-saving method for Viterbi decoder of a wireless receiver, comprising the steps of:
    determining at least one numerical value related to a data rate applied by the wireless receiver while receiving packet; and
    deciding a duty cycle of the Viterbi decoder based on the at least one numerical value, wherein power is provided to the Viterbi decoder based on the duty cycle,
    wherein the step of determining at least one numerical value is to determine at least one factor among the group of number of bit per subcarrier ($N_{BPSC}$), coding rate (R), number of data subcarrier ($N_{SD}$), and number of spatial stream ($N_{SS}$) applied by the wireless receiver while receiving packet; and the duty cycle is decided based on the at least one factor determined among the group of the number of bit per subcarrier ($N_{BPSC}$), the coding rate (R), the number of data subcarrier ($N_{SD}$), and number of spatial stream ($N_{SS}$);
    wherein the step of determining at least one numerical value is to calculate a product of at least two of the number of bit per subcarrier ($N_{BPSC}$), the coding rate (R), the number of data subcarrier ($N_{SD}$), and number of spatial stream ($N_{SS}$); and the duty cycle is decided based on the product; and
    wherein the step of deciding the duty cycle comprises the steps of:
    calculating and producing a maximum product from all possible products of the number of bit per subcarrier ($N_{BPSC}$), the coding rate (R), the number of data subcarrier ($N_{SD}$), and the number of spatial stream ($N_{SS}$); and
    calculating a ratio (r) between the product of the at least two of the number of bit per subcarrier ($N_{BPSC}$) and the coding rate (R) and the number of data subcarrier ($N_{SD}$) and number of spatial stream ($N_{SS}$) to the maximum product, and multiplying the ratio (r) with the duty cycle of the wireless receiver, wherein the duty cycle of the Viterbi decoder equals to a product of the ratio (r) and the duty cycle of the wireless receiver.

2. The power-saving method of claim 1, wherein the step of determining at least one numerical value is to determine a modulation and coding scheme (MCS) adopted by the wireless receiver while receiving packet.

3. The power-saving method of claim 1, wherein the duty cycle of the Viterbi decoder is greater than or equal to the duty cycle of the wireless receiver.

4. The power-saving method of claim 1, wherein the wireless receiver is an orthogonal frequency division multiplexing (OFDM) receiver.

5. The power-saving method of claim 1, wherein the wireless receiver is a code division multiple access (CDMA) receiver.

6. The power-saving method of claim 1, wherein the wireless receiver is compatible with IEEE 802.11n specifications.

7. A power-saving method for a bit processing circuit of a wireless receiver, wherein the wireless receiver has a time pulse circuit for outputting a time pulse signal, and the time pulse single controls the bit processing circuit to perform bit processing of the wireless receiver, comprising the steps of:
   determining a data rate applied by the wireless receiver while receiving packet; and
   deciding a duty cycle of the time pulse signal based on the data rate,
   wherein power is provided to the bit processing circuit based on the duty cycle of the time pulse signal,
   wherein the bit processing circuit comprises a Viterbi decoder for performing Viterbi decoding process, and the method further comprises the steps of:
   determining at least one numerical value related to the data rate; and
   deciding a duty cycle of the time pulse signal based on the at least one numerical value, and then providing the bit processing circuit with power based on the duty cycle of the time pulse signal;
   wherein the step of determining at least one numerical value is to determine at least one factor among the group of number of bit per subcarrier ($N_{BPSC}$), coding rate (R), number of data subcarrier ($N_{SD}$), and number of spatial stream ($N_{SS}$) that are applied by the wireless receiver while receiving packet; and the duty cycle of the time pulse signal is decided based on the determined at least one factor among the group of the number of bit per subcarrier ($N_{BPSC}$), the coding rate (R), the number of data subcarrier ($N_{SD}$), and the number of spatial stream ($N_{SS}$);
   wherein the step of determining at least one numerical value is to calculate a product of at least two of the number of bit per subcarrier ($N_{BPSC}$), the coding rate (R), the number of data subcarrier ($N_{SD}$), and number of spatial stream ($N_{SS}$), and the duty cycle of the time pulse signal is decided based on the product; and
   wherein the step of deciding a duty cycle of time pulse signal further comprises the steps of:
   calculating and producing a maximum product from all possible products of the number of bit per subcarrier ($N_{BPSC}$), the coding rate (R), the number of data subcarrier ($N_{SD}$), and number of spatial stream ($N_{SS}$); and
   calculating a ratio (r) of the product of the at least two of the number of bit per subcarrier ($N_{BPSC}$), coding rate (R) and number of data subcarrier ($N_{SD}$) and number of spatial stream ($N_{SS}$) to the maximum product, and then calculating a product of the ratio (r) and the duty cycle of the wireless receiver; wherein the duty cycle of the time pulse signal equals to a product of the ratio (r) and the duty cycle of the wireless receiver.

8. The power-saving method for bit processing circuit of wireless receiver of claim 7, wherein the data rate is determined by modulation and coding scheme (MCS) applied by the wireless receiver while receiving packet.

9. The power-saving method for bit processing circuit of wireless receiver of claim 7, wherein the duty cycle of the time pulse signal is greater than or equal to the duty cycle of the wireless receiver.

10. The power-saving method for bit processing circuit of wireless receiver of claim 7, wherein the wireless receiver is an orthogonal frequency division multiplexing (OFDM) receiver.

11. The power-saving method for bit processing circuit of wireless receiver of claim 7, wherein the wireless receiver is a code division multiple access (CDMA) receiver.

12. The power-saving method for bit processing circuit of wireless receiver of claim 7, wherein the wireless receiver is compatible with IEEE 802.11n specifications.

* * * * *